(12) United States Patent
Goh et al.

(10) Patent No.: US 8,555,736 B2
(45) Date of Patent: Oct. 15, 2013

(54) DRIVE SYSTEM FOR HERMETIC APPLICATIONS AND DEVICE HAVING SUCH DRIVE SYSTEM

(75) Inventors: Kuan Eng Johnson Goh, Singapore (SG); Cedric Troadec, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/369,568

(22) Filed: Feb. 9, 2012

(65) Prior Publication Data
US 2012/0205216 A1 Aug. 16, 2012

(30) Foreign Application Priority Data
Feb. 11, 2011 (SG) ................................ 201101014-7

(51) Int. Cl.
*F16J 15/50* (2006.01)
(52) U.S. Cl.
USPC .............................................. 74/17.8; 464/29
(58) Field of Classification Search
USPC .......................... 74/17.8; 464/29; 403/DIG. 1
See application file for complete search history.

(56) References Cited

U.S. PATENT DOCUMENTS

| 4,040,605 | A | * | 8/1977 | Towsend | 366/273 |
| 5,324,232 | A | * | 6/1994 | Krampitz | 464/29 |
| 6,041,571 | A | * | 3/2000 | Fields et al. | 53/331.5 |
| 7,438,035 | B2 | * | 10/2008 | Farah | 123/90.31 |
| 8,016,493 | B2 | * | 9/2011 | Yokoyama | 396/428 |

FOREIGN PATENT DOCUMENTS

| DE | 4121344 | | 1/1993 |
| EP | 1578009 | A2 | 9/2005 |
| JP | 8128553 | A | 5/1996 |

* cited by examiner

*Primary Examiner* — David M Fenstermacher
(74) *Attorney, Agent, or Firm* — K. David Crockett, Esq.; Niky Economy Syrengelas, Esq.; Crockett & Crockett, PC

(57) ABSTRACT

A drive system including a partition wall; a drive device positioned on a first side of the partition wall, wherein the drive device includes at least one first member positioned on said first side of said partition wall. An actuator for actuating the drive device, where the actuator is positioned on a second side of the partition wall so that the partition wall is between the drive device and the actuator, and where the actuator includes at least one second member positioned on the second side of said partition wall. The second member of the actuator is magnetically coupled to the first member of the drive device, where movement of the second member causes movement of the first member, and to a device including a drive system.

17 Claims, 4 Drawing Sheets

DRIVE SYSTEM FOR HERMETIC APPLICATIONS AND DEVICE HAVING SUCH DRIVE SYSTEM

This application claims priority to Singapore Patent Application 201101014-7 filed Feb. 11, 2011.

FIELD OF THE INVENTIONS

The present invention relates to a drive system for providing a driving force and/or motion, and in particular to a drive system for providing a driving force and/or motion in hermetic applications like, but not limited to, UHV systems, liquid tight or watertight applications (for example waterproof watches or underwater tools), space technologies, or robotics in harsh chemical environments. Moreover, the present invention relates to a device having such a drive system.

BACKGROUND OF THE INVENTIONS

In many technical applications, there is the need for drive systems that can be actuated on one side of a partition wall, whereby a driving force and/or motion is caused on the other side of said partition wall.

For example, a clock is usually provided with a casing receiving the clockwork of the casing. For adjusting the clock work, many clocks are provided with a hand wheel allocated outside the casing. The casing providing a partition wall has a through hole through which the hand wheel is mechanically connected to the clockwork for enabling adjustment of the clockwork by actuating the hand wheel. For the sake of protecting the clockwork, sealing means are usually provided within the through hole. However, a huge number of sealing means used in such applications delimit the use of such devices. For example, sealing means used in many clocks do not function under pressure, as it may occur if the clock is worn under water.

There are, however, sealing means for through holes, which means are suitable for underwater applications. Such sealing means, however, are usually more expensive and/or may increase the expenditure in manufacturing.

Such or similar problems may occur in other applications in which devices can be actuated on one side of a partition wall, whereby a driving force and/or motion is caused on the other side of said partition wall.

Besides, there are actuators for drive system, which actuators require much space.

Consequently, there is a need for low-cost drive systems which are simple in construction and thus, the present invention is based on the problem to provide a low-cost drive system for hermetic applications and the like, which is simple in construction.

SUMMARY

According to the present invention, a drive system as claimed in claim 1 is provided. A device according to the present invention is presented in claim 11. The dependent claims exemplify such a drive system.

Accordingly, the drive system according to the present invention comprises a partition wall, a drive device, and an actuator for actuating said drive device. The drive device comprises at least one first member, and the actuator comprises at least one second member. The drive device including the at least one first member and the actuator including the at least one second member are positioned on opposite sides of the partition wall, i.e. the drive device as well as the at least one first member is positioned on a first side of the partition wall, and the actuator as well as the at least one second member is positioned on a second side of said partition wall. Thus, the partition wall is between the actuator and the drive device as well as between the first member and the second member. The second member of the actuator is magnetically coupled to said first member of said drive device, so that movement of said second member causes movement of said first member. The drive system according to the present invention may be used for providing a driving force and/or motion.

The drive system may be designed such that one or both of the first and second members have a magnetic field acting on the other of said first and second members such that movement of one of said first and second members causes movement of the other of said first and second members.

The partition wall may be a wall delimiting a chamber, and the drive device including the first member may be allocated within said chamber. The actuator may be positioned outside said chamber.

The actuator and/or the second member may be in contact with and/or attached to said partition wall. For example, the actuator and/or the second member may be non-detachably, but movably, connected to the partition wall. Alternatively, the actuator and/or the second member may be detachably connected to the partition wall. In alternate embodiments, the actuator and/or the second member may be in non-contact with said partition wall.

The partition wall may be made of a non-magnetic and non-magnetizable material. Suitable materials for the partition wall may be aluminum, stainless steel, non-ferrous material, non-metals or the like.

The first member may be a bearing of the drive device or a bearing of a part of the drive device, or a part of such a bearing.

The second member may be a bearing of the actuator or a bearing of a part of the actuator, or a part of such a bearing.

At least one of the first and second members may be a magnet, in particular a permanent magnet or a current carrying conductor, and the other of the first and second members may also be a magnet, in particular a permanent magnet or a current carrying conductor, or made from a material that is magnetizable and/or can be attracted and/or repelled by a magnet.

The first and second members may be, for example, Neodymium magnets (one type of permanent magnet) (if relatively high magnetic strength is required) or electromagnets or cylindrical magnets. The first and second members may be of any shape and dimensions.

The first member may be in contact with and/or attached to the partition wall. In alternate embodiments, the first member may be in non-contact with said partition wall. For example, the first member may hang from the drive device, which is attached somewhere else in the chamber.

The actuator may be rotatably supported and/or supported for any other movement, like linear movement or arbitrary movement.

The actuator may be automatically operable and/or connected to a respective device. For example, the actuator and/or second member, which may be a knob, may be configured to be gear-like and subsequently coupled to a motor.

The drive system according to the present invention may further comprise a control device for controlling the actuator or movements of the actuator, respectively. The control device may be, for example, an electronic control device.

Alternatively, the actuator may be manually operable. For example, the actuator and/or the second member may be rotatable, and the actuator may be gear-like or dimple and/or a knob, for example, so that the user may operate the actuator and/or the second member by turning it.

The first member may be a bearing, like a ball bearing or cylinder roller bearing or the like, in particular a magnetic ball bearing or magnetic cylinder roller bearing, or a part thereof, like a ball or a cylinder. In other words the first member and a bearing may be integrated in one. Said bearing may be a bearing of the drive device. For example, the drive device may be supported by said bearing on a surface of the partition wall.

The second member may be a bearing, like a ball bearing or cylinder roller bearing or the like, in particular a magnetic ball bearing or magnetic cylinder roller bearing, or a part thereof, like a ball or a cylinder. In other words, the second member and a bearing may be integrated in one. Said bearing may be a bearing of the actuator. For example, the actuator may be supported by said bearing on a surface of the partition wall.

The first and/or second members may be designed as cylindrical magnets or encapsulated magnet (i.e. magnet and ball bearing are separate) or electromagnets, in particular when used as bearing.

Embodiments involving magnetic ball bearing may be especially preferred in applications requiring high speed of the first and/or second member, and friction may be reduced by such bearings. Embodiments involving cylindrical magnets may be preferred in applications, in which higher torque is required.

A lubricant (e.g. $MoS_2$) may be used to reduce friction with regard to support of the first and/or second members and/or the actuator and/or the drive device.

The partition wall may have, for example, a thickness of 20 mm or less, or 10 mm or less, or 5 mm or less than 5 mm, for example 3 mm or less than 3 mm or 2 mm or less than 2 mm.

Depending on the material and/or the thickness of the partition wall, an appropriate magnet should be used with regard to the first and/or second member. For example, for a thicker partition wall, bigger magnets (i.e. bigger cross-section and thinner partition wall, or smaller cross-section and thicker wall) or magnets with higher strength should be used. In particular, a combination of magnet(s) and/or any appropriate combination/arrangement that would enhance the effective strength of the coupling may be used.

The above-mentioned wall thickness refers especially to the wall thickness in the area of the partition wall, which area is or may be between the first and second members and/or between the actuator and the drive device.

The actuator and/or the partition wall may be designed such that the actuator protrudes less than 70 mm or less than 60 mm or less than 50 mm or less than 40 mm or less than 35 mm or less than 30 mm or less than 25 mm or less than 20 mm or less than 15 mm or less than 10 mm or less than 5 mm from the surface of said partition wall, which surface is on said second side.

At least one of the first and second members may be made of ferromagnetic or paramagnetic or diamagnetic material, or may be a current carrying conductor.

The drive device may have a plurality of first members.

The actuator may have a plurality of second members.

The first and second members are movable with regard to the partition wall.

The drive device or a component of the drive device, which component is connected with a first member, may be rotatably supported, wherein the first member is eccentrically positioned with regard to the respective axis of rotation.

The actuator or a component of the actuator, which component is connected with the second member, may be rotatably supported, wherein the second member is eccentrically positioned with regard to the respective axis of rotation.

According to a further aspect of the invention, a device is provided, the device comprising a drive system according to the present invention and a chamber. The chamber has at least one wall which is the partition wall of said drive system, wherein the drive device of said drive system is allocated within said chamber. The drive device may comprise a component or transmission positioned within said chamber. Said component or transmission is drivable by means of the first member of said drive device, which first member is connected to at least one member of said component or transmission. In addition, said first member is drivable by said second member of said actuator of said drive system by means of said magnetic coupling between said first member and said second member so that said first member of said component or transmission is drivable by means of said second member of said actuator of said drive system.

The above chamber may be, for example, a hermetically sealed or liquid tight, in particular watertight, chamber. The chamber may be free of through holes. In particular the area of the partition wall, which area is or may be between the first and second members and/or between the actuator and the drive device, may be free of through holes.

The drive system according to the present invention and the device according to the present invention may be used for all sorts of internal environments (e.g. vacuum, liquid, corrosive).

Further embodiments and advantages thereof will be described in connection with the accompanying drawings. It must be noted that the invention is not intended to be delimited to these exemplary embodiments. Similar reference numerals are use for identical or similar parts.

DETAILED DESCRIPTION OF THE DRAWINGS

Figure 1:
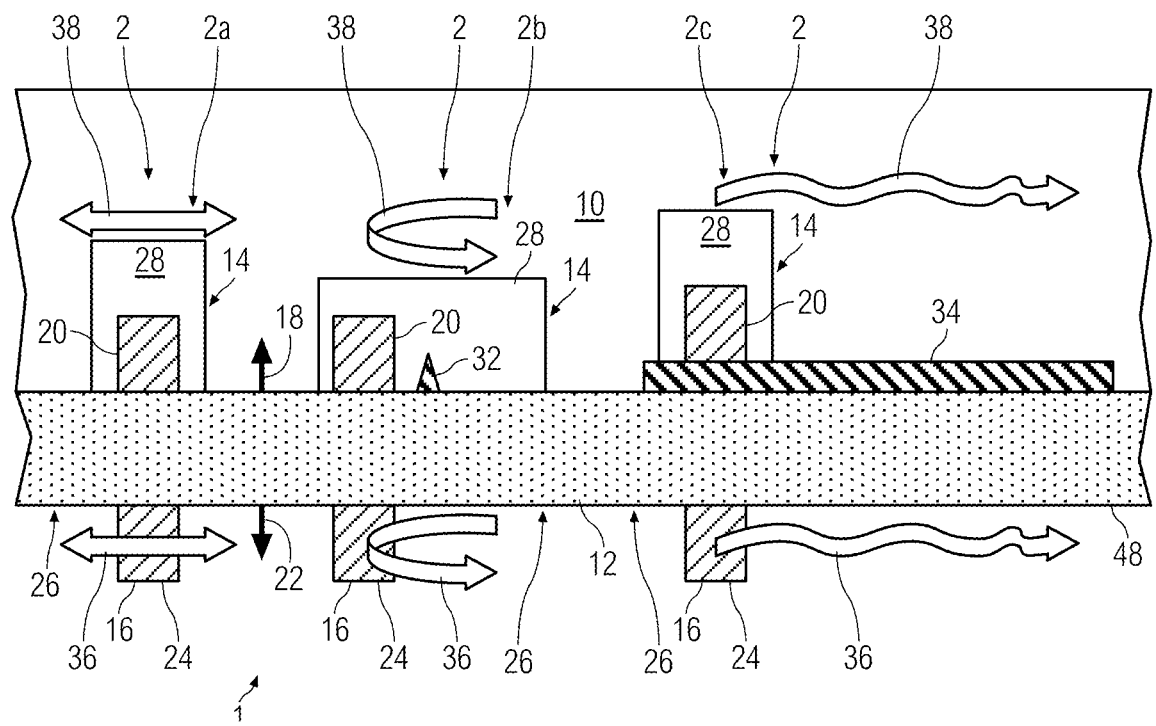
FIG. 1 schematically shows three exemplary embodiments of the present invention.
Figure 2:
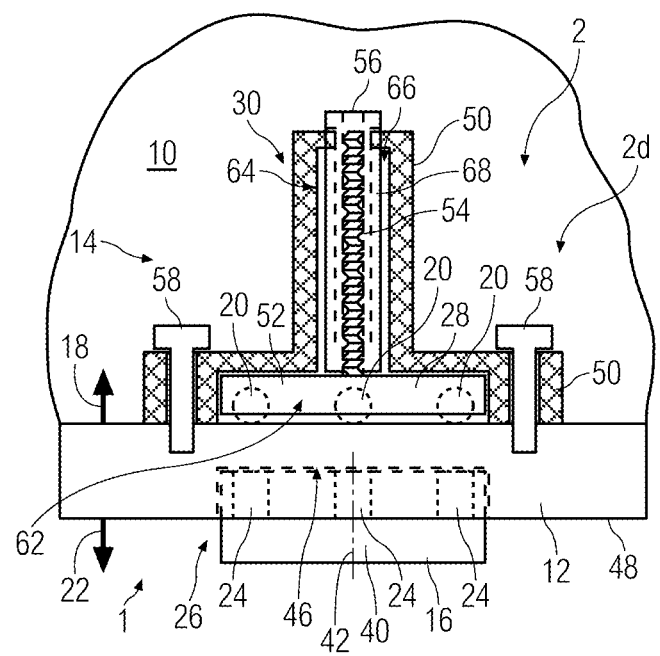
FIG. 2 schematically shows a fourth exemplary embodiment of the present invention in a first position.
Figure 3:
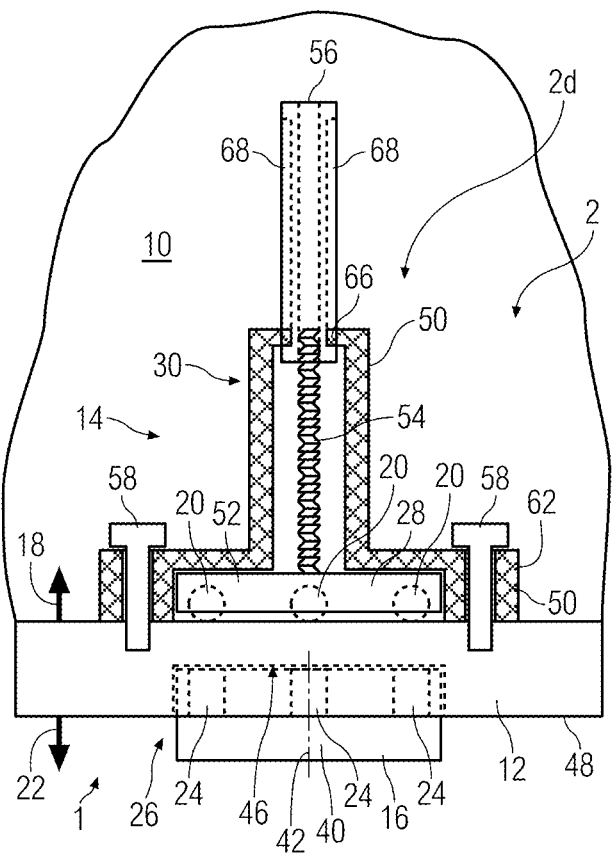
FIG. 3 schematically shows the embodiment of FIG. 2 in a second position.

FIG. 1 schematically shows three exemplary embodiments of the present invention in a partial view. FIGS. 2 and 3 show a fourth exemplary embodiment of the present invention in a partial view.

In particular, FIG. 1 shows three exemplary embodiments of a device 1 according to the present invention. The device 1 is shown with a first exemplary embodiment 2a, a second exemplary embodiment 2b, and a third exemplary embodiment 2c of a drive system 2 according to the present invention. It must be noted that the device 1 may be used with one or a combination of more than one of the three exemplary embodiments 2a/2b/2c of the drive systems 2 shown. FIGS. 2 and 3 show a further exemplary embodiment of a device 1 according to the present invention, the device 1 being shown with a fourth exemplary embodiment 2d of a drive system 2 according to the present invention. For ease of explanation, these embodiments 2a, 2b, 2c, and 2d of a drive system 2 are shortly addressed as drive system 2 in the following description, provided that the respective features may refer to all of these embodiments 2a, 2b, 2c, and 2d.

The device 1 comprises a drive system 2 and a chamber 10.

The drive system 2 is suitable for providing a driving force and/or motion, and comprises a partition wall 12, a drive device 14, and an actuator 16 for actuating said drive device 14.

The drive device 14 is positioned on a first side 18 of the partition wall 12 and comprises one or more first members 20 also positioned on said first side 18 of said partition wall 12.

The actuator 16 is positioned on a second side 22 of the partition wall 12 so that the partition wall 12 is between said drive device 14 and said actuator 16. The actuator 16 comprises at least one second member 24 positioned on said second side 22 of said partition wall 12.

The second member 24 of said actuator 16 is magnetically coupled to said first member 20 of the said drive device 14, so that movement of said second member 24 causes movement of said first member 20. For this reason, both the first 20 and the second 24 members are magnets in these examples, wherein identical (i.e. south-south or north-north) or various (i.e. south-north or north-south) poles of the respective first 20 and second 24 magnets may be directed to each other in further embodiments. However, in further alternative embodiments, only one of the first 20 and second 24 members may be a magnet, and the other one of these members 20, 24 may be magnetizable or attracted and/or repelled by said magnet.

The partition wall 12 of said drive system 2 is a wall delimiting the chamber 10 of the device 1.

The chamber 10 (shown schematically) is a hermetically sealed or liquid tight environment, in particular a watertight chamber, and has no through holes in the area 26 between the drive device 14 and the actuator 16.

The drive device 14 is positioned within the chamber 10, and so the first side 18 of the partition wall 12 is the inner side of the chamber 10, and the second side 22 of the partition wall 12 is the outer side of the chamber 10.

The drive device 14 comprises a component 28 or transmission 30 positioned within the chamber 10. The component 28 or transmission 30 (see FIG. 2) is drivable by means of the first member 20 of said drive device 14, which first member 20 is connected to said component 28 or to at least one member of said transmission 30.

The first member 20 is drivable by said second member 24 of said actuator 16 of said drive system 2 by means of said magnetic coupling acting between said first member 20 and said second member 24 so that said component 28 or member of said transmission 30 is drivable by means of said second member 24 of said actuator 16.

Reverting to FIG. 1, the first 20 and second 24 members of the drive system 2a are translatively and/or linear movable and/or guided by guide means (not shown).

The first 20 and/or second 24 members of the drive system 2b are rotatable and/or rotatably guided by guide means, such as a shaft or pin 32, for example. The first member 20 is eccentrically positioned in this exemplary embodiment.

The first 20 and/or second 24 members of the drive system 2c may perform arbitrary motion. A track 34 for guiding the second member 24 may be provided.

In FIG. 1, arrows 36 symbolize the external operation, and arrows 38 symbolize the internal reaction (the expressions "internal" and "external" refer to the chamber 10).

Referring to the exemplary embodiment shown in FIGS. 2 and 3, the actuator 16 comprises an external disc coupler 40 and a plurality of second members 24 circumferentially distributed with regard to the central axis 42 of the external disc coupler 40. For example, four of second members 24 may be provided. The external disc coupler 40 holds the second members 16 designed as magnets (e.g. Neodymium). The external disc coupler 40 may have a cylinder-type shape. The second members 16 may be integrated within the external disc coupler 40.

Figure 4:
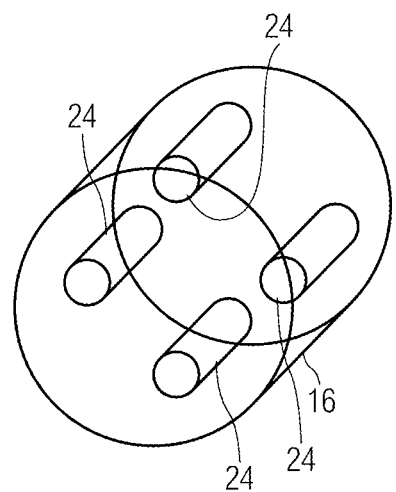
FIG. 4 schematically shows a first exemplary actuator designed as hand-knob that may be used in any of the embodiments of the invention.
Figure 5:
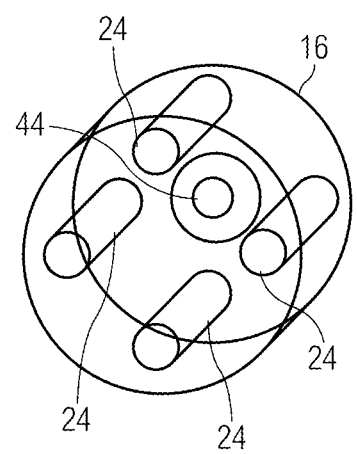
FIG. 5 schematically shows a second exemplary actuator designed as hand-knob that may be used in any of the embodiments of the invention.

The actuator 16 or external disc coupler 40, respectively, may be designed as a protruding hand-knob (see FIG. 4) or as a flushed dimple-type dial-knob (see FIG. 5), for example. In FIG. 5, reference numeral 44 denotes a dimple. An actuator 16 or external disc coupler 40, respectively, designed as flushed dimple-type dial-knob (see FIG. 5) may be flushed with the partition wall 12.

The partition wall 12 has a recess 46 in its outer surface 48, in which the recess 46 is not a through hole, and the actuator 16 or external disc coupler 40, respectively, is received and/or guided within said recess 46.

The drive device 14 comprises a containment 50, an internal disc coupler 52, a plurality of first members 20 designed as magnets, a lead screw 54, and a nut or shaft 56, respectively.

The containment 50 is held at the partition wall 12, for example by screws 58. The containment 50 may be hollow and may have inner cylindrical walls or surface sections, respectively.

A first axial section 62 of the containment 50, which first axial section 62 is adjacent to the partition wall 12, has a larger inner diameter than a second axial section 64 of the containment 50, which second axial section 64 is averted from the partition wall 12.

The first axial section 62 of the containment 50 receives the internal disc coupler 52, and the second axial section 64 of the containment 50 receives the lead screw 54 centrally fixed to the internal disc coupler 52.

The nut or shaft 56, respectively, is designed to be hollow and is provided with internal thread or the like engaging the external thread of the lead screw 54. For example, the nut or shaft 56 may be provided with a threaded core. The nut or shaft 56 may have a cylindrical or rectangular outer shape, or may have any other shape.

A linear guide for the nut or shaft 56, respectively, is provided, and so rotation of the internal disc coupler 52 and, therefore, rotation of the lead screw 54 causes linear movement of the nut or shaft 56, respectively.

For example, the linear guide is provided by a guide pin 66 provided on or by the containment 50 and a guide rail 68 provided in the outer surface of the nut or shaft 56, respectively (FIGS. 2 and 3).

The internal disc coupler 52 holds a plurality of first members 20. The first members 20 may be ball-type members. The first members 20 are magnets. The first members 20 serve as bearing, in particular ball bearings, and support the internal disc coupler 52 against the partition wall 12. The first members 20 are circumferentially distributed with regard to the axis of rotation of the internal disc coupler 52.

Figure 6:
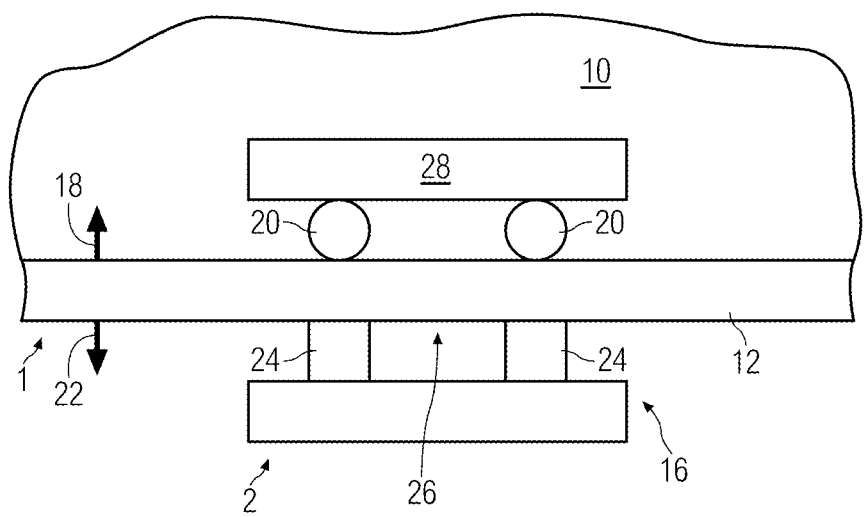
FIG. 6 schematically shows a fifth exemplary embodiment of the present invention in a first position.
Figure 7:
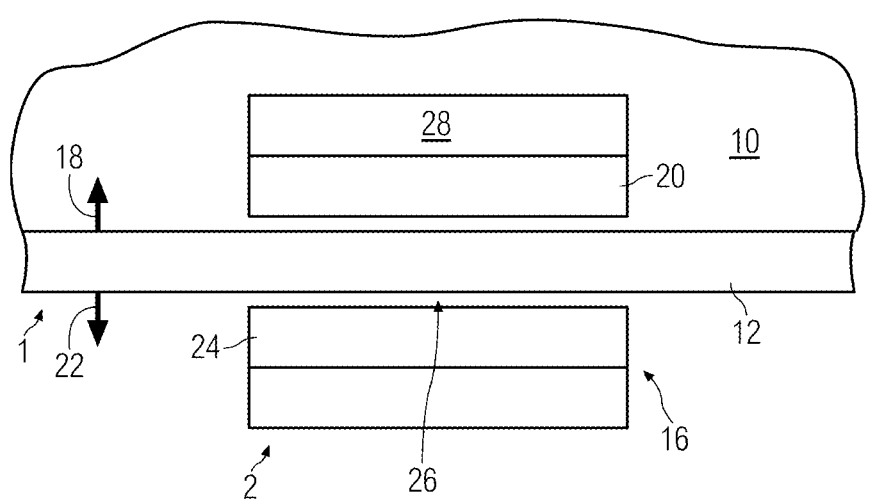
FIG. 7 schematically shows a sixth exemplary embodiment of the present invention in a first position.
Figure 8:
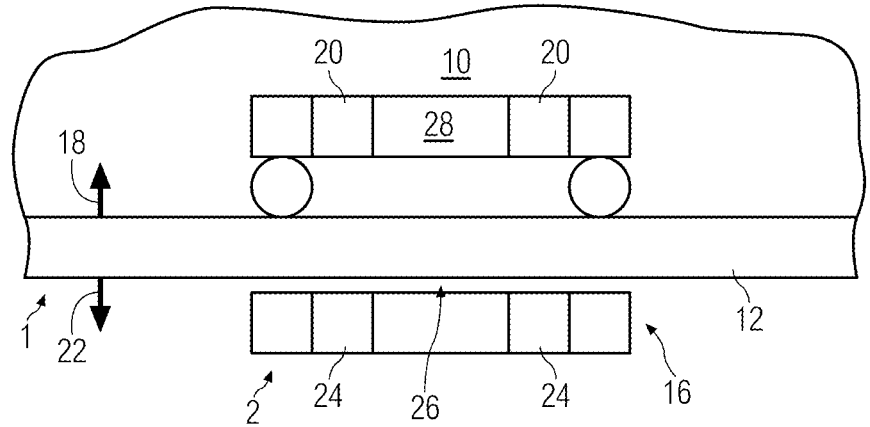
FIG. 8 schematically shows a seventh exemplary embodiment of the present invention in a first position.

FIGS. 6 to 8 show some further embodiments which may be combined with any of the preceding embodiments.

In FIG. 6, the first 20 and second members 24 are designed in correspondence with the embodiment shown in FIGS. 2 and 3.

In FIG. 7, the first 20 and second 24 members are designed as cylindrical magnets.

In FIG. 8, the second members 24 are designed in correspondence with the embodiments shown in FIGS. 2 and 3, and the first members 20 are magnets integrated in a component 28 of the drive device 14, which component 28 is supported against the partition wall 12 by separated ball bearing.

The first member 20 and second member 24 may be made of or encapsulated by a friction reducing material to reduce the friction between the first member 20 and the partition wall 12 and/or between the second member 24 and the partition wall 12. The first and/or second members 20, 24 may be magnets encapsulated by the friction reducing material. The first and/or second members 20, 24 may also be ball-type members or bearing encapsulated by the friction reducing material.

The friction reducing material may include one or more of graphite, polytetrafluoroethylene (PTFE), molybdenum disulphide ($MoS_2$), boron nitride and tungsten disulphide ($WS_2$).

The first and/or second members 20, 24 may be encapsulated by a graphite layer by simple rubbing, burnishing, impacting, impingement (powdered graphite) or air-sprayed (resin-bonded or inorganically bonded) coating. The graphite layer may be at least 0.00254 mm (0.0001 inch), preferably at least 0.0254 mm (0.001 inch), preferably at least 0.254 mm (0.01 inch) in pure form and up to 0.0127 mm (0.0005 inch) resin-bonded or ceramic-bonded lubricants. Graphite may be used in normal air atmosphere and in temperature of 450° C. or less.

The first and second members 20, 24 may be encapsulated by PTFE by spraying. PTFE may be preferred where there are low surface velocities and at a pressure greater than 0.345 bar (5 psi). PTFE may be used in a temperature of 260° C. or less.

The first and second members 20, 24 may be encapsulated by a layer of $MoS_2$ by simple rubbing, burnishing, air-sprayed (resin-bonded or inorganically bonded) coating, sputtering by physical vapour deposition (PVD). The $MoS_2$ layer may range from 5 to 15 micrometers, preferably 7 to 13 micrometers, preferably 9 to 11 micrometers. However, encapsulation by PVD techniques may provide a thickness layer of at least 0.2 micrometers, preferably 0.3 micrometers, preferably 0.4 micrometers and preferably 0.5 micrometers. $MoS_2$ is preferred in vacuum or high temperature environment e.g. 704.5° C. (1300° F.)

The first and second members 20, 24 may be encapsulated by a layer of boron nitride by spraying, dipping or brushing. Boron nitride is preferred in environment where the first and second members 20, 24 may be exposed to chemicals or high temperature e.g. 1200° C. (2192° F.).

The first and second members 20, 24 may be encapsulated by a layer of $WS_2$ by simple rubbing, burnishing, impacting, or impingement. The $WS_2$ layer may be 0.00508 mm (0.0002 inch) or less, preferably 0.00254 mm (0.0001 inch) or less. $WS_2$ is preferred in vacuum or high temperature environment e.g. 760° C. (1400° F.).

The partition wall 12 may be coated with the friction reducing material to reduce friction between the first member 20 and/or second member 24.

As shown by the exemplary embodiment, the invention may solve the problem of having to ensure a hermetic seal in applications where an internal mechanism has to be driven externally, and it is suitable for situations requiring the external driving mechanism to be small.

Examples include actuation of internal mechanical drives for ultrahigh vacuum systems, for chemically hazardous environments, or for consumer products such as mechanical watches and food blenders. Existing solutions are primarily based on direct mechanical coupling between the external actuator and the internal mechanics via a through-hole with hermetic sealing, and some typically feature large external extensions which include bellows to accommodate motion without breaking seal.

By implementing magnetic coupling, there is no need for a through-hole and hermetic sealing in the positions requiring external couplings to internal mechanics. External magnetic couple directly to internal magnets which are mounted on coupling blocks which drive the internal mechanics. With magnetic coupling, the main drive mechanism can be confined internally and thus reduces the space requirements of the external drive coupler significantly.

The internal mechanical motion can be simply actuated by an external motion via magnetic coupling with greatly reduced space overheads externally and no risk of seal leak (there is no seal). Technologically, this would be advantageous for situations/applications requiring the ability to externally control mechanical action in gas-tight or liquid-tight environments. The size of the external drive coupler is only limited by the size of the magnet used and this can be made very small with very strong magnets (e.g. neodymium).

The device according to the present invention or the drive system according to the present invention, respectively, may incorporate degrees of freedom such as translation, rotation, azimuthal displacements, or any arbitrary motion.

The actuator may be of various design (dimensions, style, material) and is driven manually or automatically (e.g. by a motor).

The shaft 56 and/or the guide pin 66 and/or the containment 50 may be provided with vent holes.

The invention or the exemplary embodiments thereof, respectively, have the advantage that "low profile" or thin actuators may be used. In addition, the actuator or external magnets may be removably mounted, which may have advantages with regard to safety and which may be space-saving.

A further advantage of this design is the ease of removal of the external magnet once that is not necessary or once it has been adjusted into the desired position. In addition, there is no need for through-holes in the partition wall.

The embodiments shown in the figures or the invention, respectively, may be used in watches, UHV systems, water tight devices, like waterproof watches or underwater tools, spaces technologies, robotics in harsh chemical environments or the like.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

The invention claimed is:

1. A drive system for providing a driving force and/or motion, comprising:
   a partition wall (12);
   a drive device (14) positioned on a first side (18) of said partition wall (12), wherein said drive device (14) comprises at least one first member (20) positioned on said first side (18) of said partition wall (12); and an actuator (16) for actuating said drive device (14), wherein said actuator (16) is positioned on a second side (22) of said partition wall (12) so that the partition wall (12) is between said drive device (14) and said actuator (16), and wherein said actuator (16) comprises at least one second member (24) positioned on said second side (22) of said partition wall (12);

wherein said second member (24) of said actuator (16) is magnetically coupled to said first member (20) of said drive device (14), so that movement of said second member (24) causes movement of said first member (20);

and wherein at least one of said first member (20) and second member (24) is a bearing, namely a ball bearing or cylindrical roller bearing.

2. The drive system according to claim 1, wherein said drive device (14) is allocated within a chamber (10) comprising said partition wall (12), with said actuator (16) being positioned outside said chamber (10).

3. The drive system according to claim 1, wherein at least one of said actuator (16) and said second member (24) is in contact with or attached to said partition wall (12).

4. The drive system according to claim 3, wherein at least one of said actuator (16) or said second member (24) is detachably attached to said partition wall (12).

5. The drive system according to claim 1, wherein said partition wall (12) is made of a non-magnetic and non-magnetizable material, or of a mildly magnetic material.

6. The drive system according to claim 1, wherein the first member (20) is a bearing of the drive device (14).

7. The drive system according to claim 1, wherein said first member (20) is in contact with or attached to the partition wall (12).

8. The drive system according to claim 1, wherein a control device for controlling said actuator (16) is provided.

9. The drive system according to claim 1, wherein said actuator (16) protrudes less than 70 mm from a surface on said second side (22) of said partition wall (12).

10. The drive system according to claim 1, wherein at least one of the first (20) and second (24) members is a permanent magnet.

11. The drive system according to claim 1, wherein the first member (20) or the second member (24) is made of or encapsulated by a friction reducing material for reducing friction between the first member (20) and partition wall (12) or between the second member (24) and partition wall (12).

12. The drive system according to claim 1, wherein the partition wall (12) is coated with a friction reducing material to reduce friction between the first member (20) or second member (24) and the partition wall (12).

13. The drive system according to claim 12, wherein the friction reducing material includes one or more of graphite, polytetrafluoroethylene (PTFE), molybdenum disulphide ($MoS_2$), boron nitride and tungsten disulphide ($WS_2$).

14. A device (1), comprising:
a drive system (2, 2a, 2b, 2c) comprising:
a partition wall (12);
a drive device (14) positioned on a first side (18) of said partition wall (12), wherein said drive device (14) comprises at least one first member (20) positioned on said first side (18) of said partition wall (12);
an actuator (16) for actuating said drive device (14), wherein said actuator (16) is positioned on a second side (22) of said partition wall (12) so that the partition wall (12) is between said drive device (14) and said actuator (16), and wherein said actuator (16) comprises at least one second member (24) positioned on said second side (22) of said partition wall (12);
wherein said second member (24) of said actuator (16) is magnetically coupled to said first member (20) of said drive device (14), so that movement of said second member (24) causes movement of said first member (20);
wherein at least one of said first member (20) and second member (24) is a bearing, namely a ball bearing or cylindrical roller bearing; and
a chamber (10), a wall of which is the partition wall (12) of said drive system (2, 2a, 2b, 2c);
wherein the drive device (14) of said drive system (2, 2a, 2b, 2c) is allocated within said chamber (10);
wherein said drive device (14) comprises a component (28) or transmission (30) positioned within said chamber (10); and
wherein said component (28) or transmission (30) is drivable by means of the first member (20) of said drive device (14), which first member (20) is connected to said component (28) or at least one member of said transmission (30), and
wherein said first member (20) is drivable by said second member (24) of said actuator (16) of said drive system (2, 2a, 2b, 2c) by means of said magnetic coupling between said first member (20) and said second member (24) so that said component (28) or member of said transmission (30) is drivable by means of said second member (24) of said actuator (16).

15. The drive system according to claim 1, further comprising a lubricant for reducing friction of at least one of the first member (20), second member (24), the actuator (16) and the drive device (14).

16. The drive system according to claim 1, wherein at least one of the first member (20) and the second member (24) are made of or encapsulated by a friction reducing material for reducing the friction between the first member (20) and the partition wall (12) and between the second member (24) and the partition wall (12) accordingly.

17. The drive system according to claim 1, wherein at least one of the first member (20) and the second member (24) are magnets encapsulated by a friction reducing material.

* * * * *